(12) United States Patent
Lee et al.

(10) Patent No.: US 8,160,169 B1
(45) Date of Patent: *Apr. 17, 2012

(54) FRAME SYNCHRONIZATION IN ORTHOGONAL FREQUENCY-DIVISION MULTIPLEXING SYSTEMS

(75) Inventors: Jungwon Lee, Cupertino, CA (US); Qing Zhao, Santa Clara, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 13/214,766

(22) Filed: Aug. 22, 2011

Related U.S. Application Data

(63) Continuation of application No. 12/002,610, filed on Dec. 18, 2007, now Pat. No. 8,005,155.

(60) Provisional application No. 60/882,339, filed on Dec. 28, 2006.

(51) Int. Cl.
*H04K 1/10* (2006.01)

(52) U.S. Cl. ........ 375/260; 375/316; 375/340; 375/363; 375/364; 375/365; 375/366; 375/367; 375/368; 370/509; 370/510; 370/511; 370/512; 370/513; 370/514; 370/515

(58) Field of Classification Search .................. 375/260, 375/316, 340, 363, 364, 365, 366, 367, 368; 370/509, 510, 511, 512, 513, 514, 515
See application file for complete search history.

(56) References Cited

U.S. PATENT DOCUMENTS

| | | | |
|---|---|---|---|
| 6,909,760 B2 | 6/2005 | Borowski et al. | |
| 7,729,456 B2 | 6/2010 | Zhang | |
| 2007/0183391 A1 | 8/2007 | Akita et al. | |

OTHER PUBLICATIONS

IEEE Std 802.16-2004 (Revision of IEEE Std 802.16/2001) IEE Standard for Local and metropolitan area networks; Part 16: Air Interface for Fixed Broadband Wireless Access Systems; IEEE Computer Society and the IEEE Microwave Theory and Techniquest Society; Sponsored by the LAN/MAN Standards Committee; Oct. 1, 2004; 893 pages.

IEEE Std 802.16e™-2005 and IEEE Std 802.16™-2004/Cor1-2005 (Amendment and Corrigendum to IEEE Std 802.16/2004); IEE Standard for Local and metropolitan area networks; Part 16: Air Interface for Fixed and Mobile Broadband Wireless Access Systems; Amendment 2: Physical and Medium Access Control Layers for combined Fixed and Mobile Operation in Licensed Bands and Corrigendum 1; IEEE Computer Society and the IEEE Microwave Theory and Techniquest Society; Sponsored by the LAN/MAN Standards Committee; Feb. 28, 2006; 864 pages.

*Primary Examiner* — Leon Flores

(57) ABSTRACT

A system including a magnitude measuring module, an energy normalization module, and a metric generation module. The magnitude measuring module is configured to measure magnitudes of real portions of differentially demodulated signals, wherein the differentially demodulated signals are generated by differential demodulation of signals received from a base station. The energy normalization module is configured to generate a sum of energies of a plurality of subcarriers included in the signals received from the base station. The metric generation module is configured to generate a plurality of metrics for a plurality of symbols included in the signals received from the base station. The metric generation module is further configured to detect, based on the plurality of metrics, a preamble symbol included in the signals received from the base station.

16 Claims, 14 Drawing Sheets

Preamble modulation series per segment and IDcell for the 1K FFT mode

| Index | IDcell | Segment | Series to modulate (in hexadecimal format) |
|---|---|---|---|
| 0 | 0 | 0 | 0xA6F294537B285E1844677D133E4D53CCB1F182DE00489E53E6B6E77065C7EE7D0ADBEAF |
| 1 | 1 | 0 | 0x668321CBBE7F462E6C2A07E8BBDA2C7F7946D5F69E3AC8ACF7D64AB4A33C467001F3B2 |
| 2 | 2 | 0 | 0x1C75D30B2DF72CEC9117A0BDSEAF8E0302461FC07456AC906ADE03E9B5AB5E1D3F98C6E |
| 3 | 3 | 0 | 0x5F9A2E8CA7CC69A5227104FB1CC2262809F3B10D0542B9BDFDA4A73A7046096DF0E8D3D |
| 4 | 4 | 0 | 0x82F8A0AB918138D84BB86224F6C342D81BC8BFE791CA9EB54096159D672E91C6E13032F |
| 5 | 5 | 0 | 0xEE27E59B84CCF15BB1565EF90D478CD2C49EE8A70DE368EED7C9420B0C6FFAF9AF035FC |
| 6 | 6 | 0 | 0xC1DF5AE28D1CA6A8917BCDAF4E73BD93F931C44F93C3F12F0132FB643EFD5885C8B2BCB |
| 7 | 7 | 0 | 0xFCA36CCCF7F3E0602696DF745A68DB948C57DFA9575BEA1F05725C42155898F0A63A248 |
| ...... | ...... | ...... | ...... |

FIG. 4

FRAME SYNCHRONIZATION IN ORTHOGONAL FREQUENCY-DIVISION MULTIPLEXING SYSTEMS

CROSS-REFERENCE TO RELATED APPLICATIONS

This present disclosure is a continuation of U.S. application Ser. No. 12/002,610 filed on Dec. 18, 2007, which claims priority under 35 U.S.C. §119(e) to U.S. Provisional Application No. 60/882,339, filed on Dec. 28, 2006.

FIELD

The present disclosure relates to communication systems, and more particularly to frame synchronization in systems using orthogonal frequency domain multiplexing (OFDM).

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Referring now to FIG. 1, a typical communication system 10 comprises an information source 12, a transmitter 13, a communication channel 20, a receiver 27, and a destination 28. The transmitter 13 comprises a source encoder 14, a channel encoder 16, and a modulator 18. The receiver 27 comprises a demodulator 22, a channel decoder 24, and a source decoder 26.

The information source 12 may be an analog source such as a sensor that outputs information as continuous waveforms or a digital source such as a computer that outputs information in a digital form. The source encoder 14 converts the output of the information source 12 into a sequence of binary digits (bits) called an information sequence u. The channel encoder 16 converts the information sequence u into a discrete encoded sequence v called a codeword. The modulator 18 transforms the codeword into a waveform of duration T seconds that is suitable for transmission.

The waveform output by the modulator 18 is transmitted via the communication channel 20. Typical examples of the communication channel 20 are telephone lines, wireless communication channels, optical fiber cables, etc. Noise, such as electromagnetic interference, inter-channel crosstalk, etc., may corrupt the waveform.

The demodulator 22 receives the waveform. The demodulator 22 processes each waveform and generates a received sequence r that is either a discrete (quantized) or a continuous output. The channel decoder 24 converts the received sequence r into a binary sequence u' called an estimated information sequence. The source decoder 26 converts u' into an estimate of the output of the information source 12 and delivers the estimate to the destination 28. The estimate may be a faithful reproduction of the output of the information source 12 when u' resembles u despite decoding errors that may be caused by the noise.

Communication systems use different modulation schemes to modulate and transmit data. For example, a radio frequency (RF) carrier may be modulated using techniques such as frequency modulation, phase modulation, etc. In wireline communication systems, a transmitted signal generally travels along a path in a transmission line between a transmitter and a receiver. In wireless communication systems, however, a transmitted signal may travel along multiple paths. This is because the transmitted signal may be reflected and deflected by objects such as buildings, towers, airplanes, cars, etc., before the transmitted signal reaches a receiver. Each path may be of different length. Thus, the receiver may receive multiple versions of the transmitted signal. The multiple versions may interfere with each other causing inter symbol interference (ISI). Thus, retrieving original data from the transmitted signal may be difficult.

To alleviate this problem, wireless communication systems often use a modulation scheme called orthogonal frequency division multiplexing (OFDM). In OFDM, a wideband carrier signal is converted into a series of independent narrowband sub-carrier signals that are adjacent to each other in frequency domain. Data to be transmitted is split into multiple parallel data streams. Each data stream is modulated using a sub-carrier. A channel over which the modulated data is transmitted comprises a sum of the narrowband sub-carrier signals, which may overlap.

When each sub-carrier closely resembles a rectangular pulse, modulation can be easily performed by Inverse Discrete Fourier Transform (IDFT), which can be efficiently implemented as an Inverse Fast Fourier Transform (IFFT). When IFFT is used, the spacing of sub-carriers in the frequency domain is such that when the receiver processes a received signal at a particular frequency, all other signals are nearly zero at that frequency, and ISI is avoided. This property is called orthogonality, and hence the modulation scheme is called orthogonal frequency division multiplexing (OFDM).

Referring now to FIGS. 2A-2C, a wireless communication system 50 may comprise base stations BS1, BS2, and BS3 (collectively BS) and one or more mobile stations (MS). Each BS may comprise a processor 30, a medium access controller (MAC) 32, a physical layer (PHY) module 34, and an antenna 36 as shown in FIG. 2B. Similarly, each MS may comprise a processor 40, a medium access controller (MAC) 42, a physical layer (PHY) module 44, and an antenna 46 as shown in FIG. 2C. The PRY modules 34 and 44 may comprise radio frequency (RF) transceivers (not shown) that transmit and receive data via antennas 36 and 46, respectively. Each BS and MS may transmit and receive data while the MS moves relative to the BS.

Specifically, each BS may transmit data using orthogonal frequency division multiplexing access (OFDMA) system. Each BS may transmit data typically in three segments: SEG1, SEG2, and SEG3. The MS, which moves relative to each BS, may receive data from one or more base stations depending on the location of the MS relative to each BS. For example, the MS may receive data from SEG 3 of BS1 and SEG 2 of BS2 when the MS is located as shown in FIG. 2A.

Relative motion between MS and BS may cause Doppler shifts in signals received by the MS. This can be problematic since systems using OFDMA are inherently sensitive to carrier frequency offsets (CFO). Therefore, pilot tones are generally used for channel estimation refinement. For example, some of the sub-carriers may be designated as pilot tones for correcting residual frequency offset errors.

Additionally, the PHY module 34 of each BS typically adds a preamble to a data frame that is to be transmitted. Specifically, the PHY module 34 modulates and encodes the data frame comprising the preamble at a data rate specified by the MAC 34 and transmits the data frame. When the PHY module 44 of the MS receives the data frame, the PHY module 44 uses the preamble in the data frame to detect a beginning of packet transmission and to synchronize to a transmitter clock of the BS.

According to the I.E.E.E. standards 802.16 and 802.16e, which are incorporated herein by reference in their entirety, a first symbol in the data frame transmitted by the BS is a preamble symbol from a preamble sequence. The preamble sequence typically contains an identifier called IDcell, which is a cell ID of the BS, and segment information. The BS selects the preamble sequence based on the IDcell and the segment number of the BS. Each BS may select different preamble sequences. Additionally, each BS may select preamble sequences that are distinct among the segments of that BS.

The BS modulates multiple sub-carriers with the selected preamble sequence. Thereafter, the BS performs IFFT, adds a cyclic prefix, and transmits a data frame. The MS uses the cyclic prefix to perform symbol timing and fractional carrier frequency synchronization. Unless the MS knows the preamble sequence, however, the MS cannot associate itself to a particular segment of a particular BS.

SUMMARY

In general, in one aspect, this specification discloses a system including a magnitude measuring module, an energy normalization module, and a metric generation module. The magnitude measuring module is configured to measure magnitudes of real portions of differentially demodulated signals, wherein the differentially demodulated signals are generated by differential demodulation of signals received from a base station. The energy normalization module is configured to generate a sum of energies of a plurality of subcarriers included in the signals received from the base station. The metric generation module is configured to generate a plurality of metrics for a plurality of symbols included in the signals received from the base station. The plurality of metrics are generated based on i) the magnitudes of the real portions of the differentially demodulated signals, and ii) the sum of the energies of the plurality of subcarriers included in the signals received from the base station. The metric generation module is further configured to detect, based on the plurality of metrics, a preamble symbol included in the signals received from the base station.

In general, in another aspect, this specification discloses a method including: measuring magnitudes of real portions of differentially demodulated signals, wherein the differentially demodulated signals are generated by differential demodulation of signals received from a base station; generating a sum of energies of a plurality of subcarriers included in the signals received from the base station; and generating a plurality of metrics for a plurality of symbols included in the signals received from the base station. The plurality of metrics are generated based on i) the magnitudes of the real portions of the differentially demodulated signals, and ii) the sum of the energies of the plurality of subcarriers included in the signals received from the base station. The method further includes detecting, based on the plurality of metrics, a preamble symbol included in the signals received from the base station.

In still other features, the systems and methods described above are implemented by a computer program executed by one or more processors. The computer program can reside on a computer readable medium such as but not limited to memory, non-volatile data storage, and/or other suitable tangible storage mediums.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 4 is a table showing preamble sequences used by base stations of FIG. 3 to transmit data;

DETAILED DESCRIPTION

Figure 1:
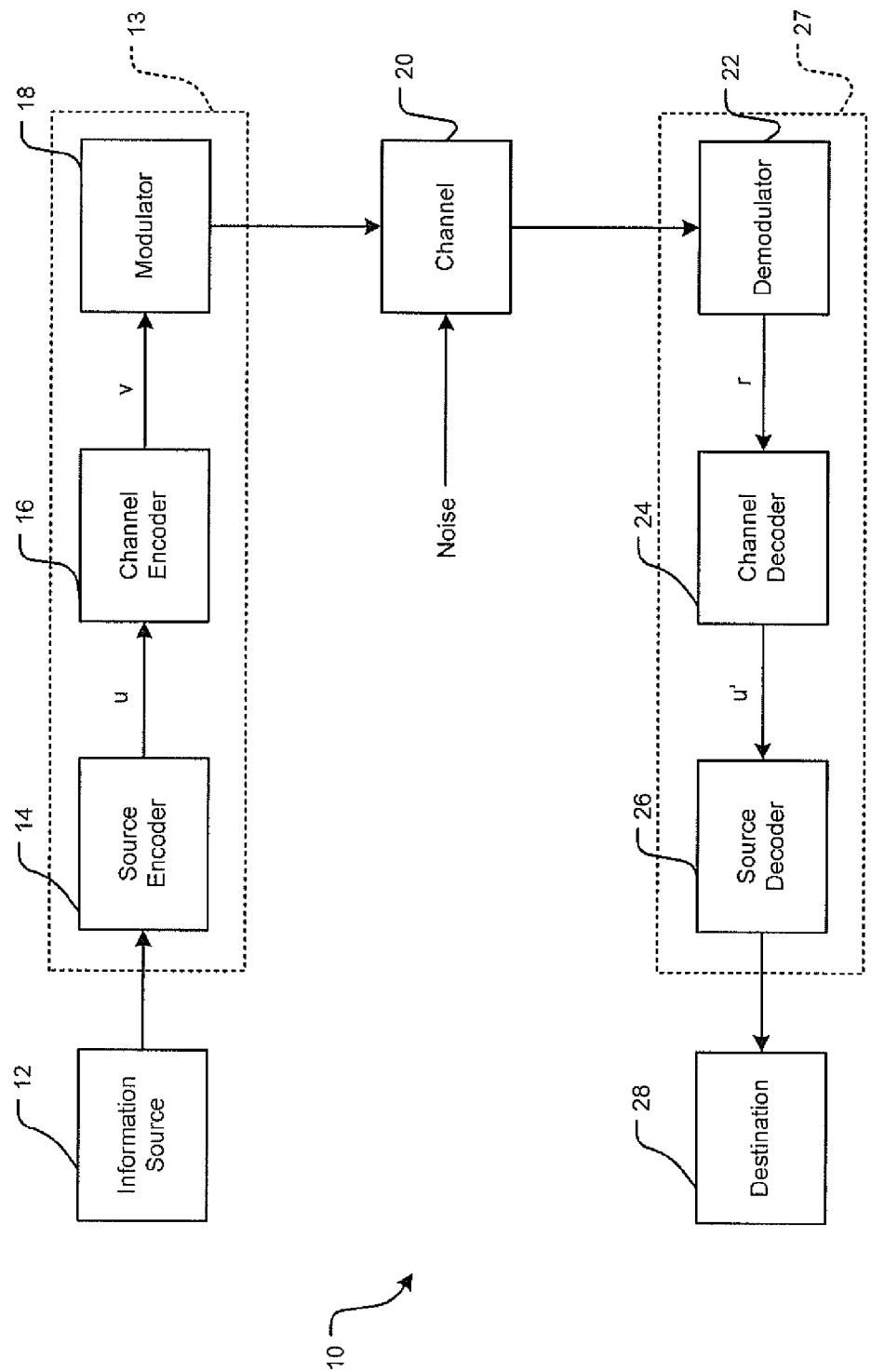
FIG. 1 is a functional block diagram of an exemplary communication system according to the prior art.
Figure 2A:
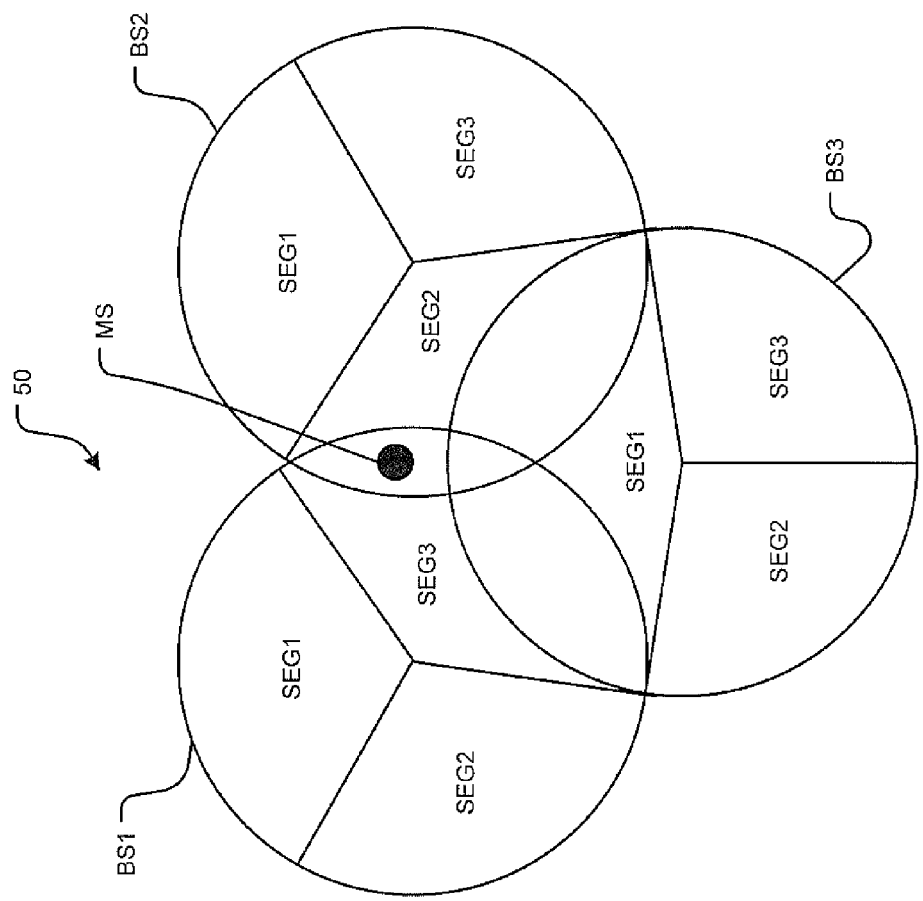
FIG. 2A is a schematic representation of an exemplary wireless communication system comprising three base stations and a mobile station according to the prior art.
Figure 2B:
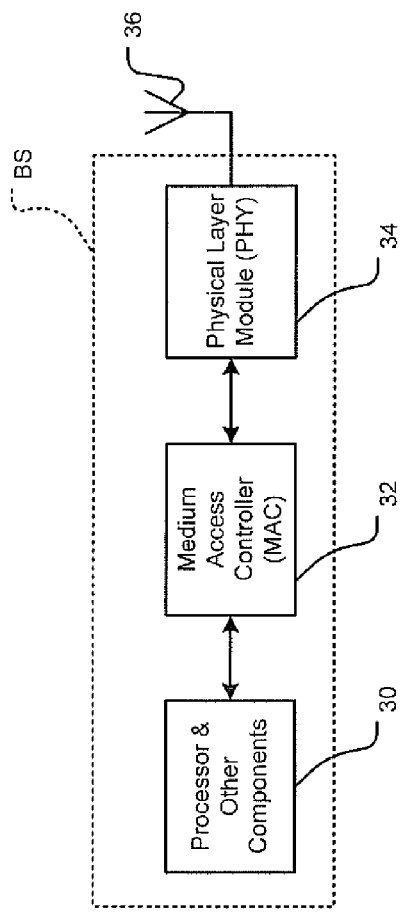
FIG. 2B is a functional block diagram of an exemplary base station utilized in the system of FIG. 2A.
Figure 2C:
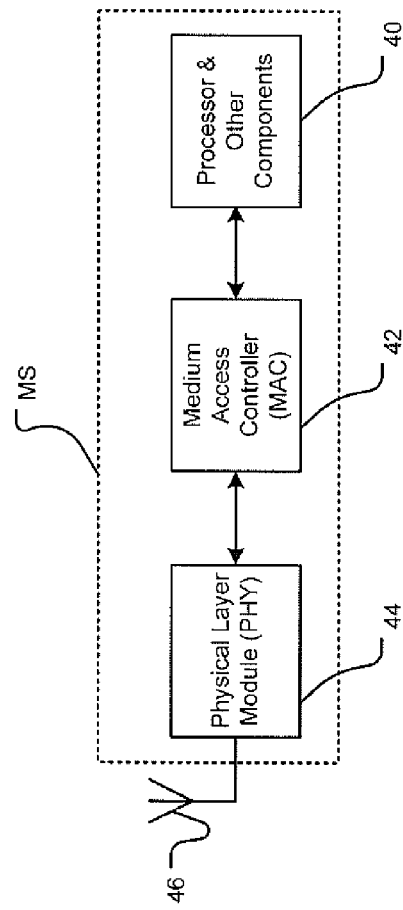
FIG. 2C is a functional block diagram of an exemplary mobile station utilized in the system of FIG. 2A.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Figure 3:
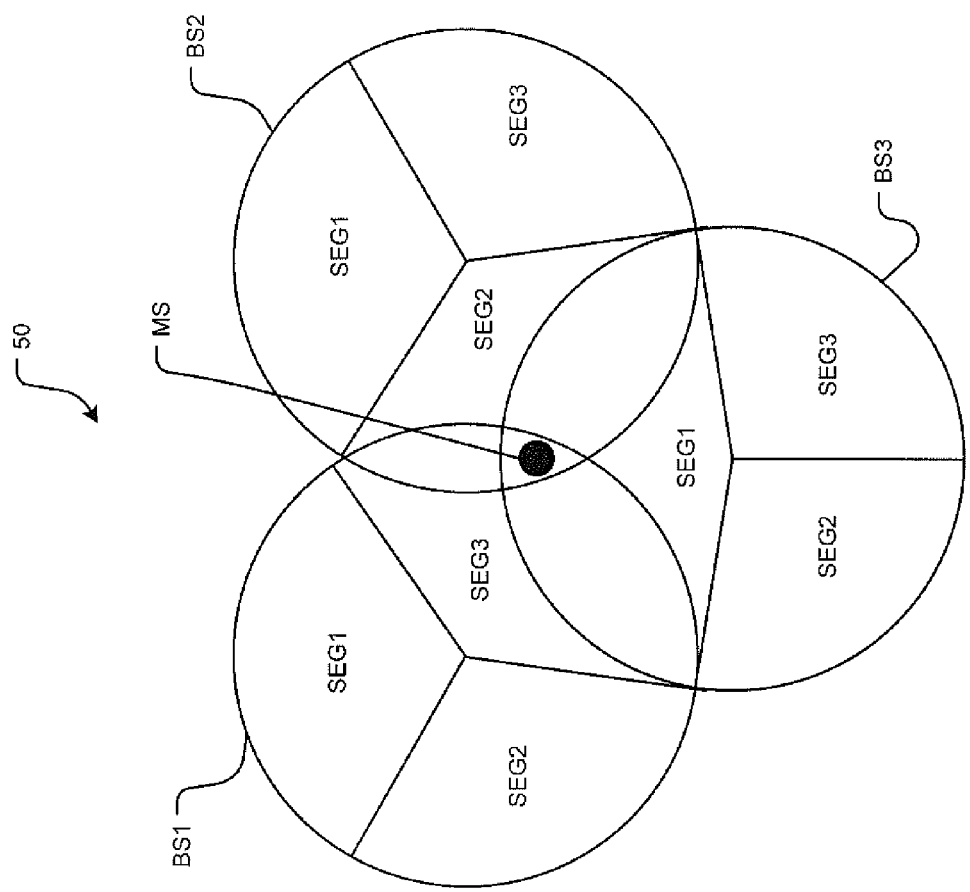
FIG. 3 is a schematic representation of an exemplary wireless communication system comprising three base stations and a mobile station.

Referring now to FIG. 3, a wireless communication system 50 may comprise base stations BS1, BS2, and BS3 (collectively BS) and one or more mobile stations (MS). Generally, one MS may communicate with up to three adjacent base stations. Each BS may transmit data that is modulated using an orthogonal frequency division multiplexing access (OFDMA) system.

Specifically, each BS may transmit data in three segments: SEG1, SEG2, and SEG3. The MS, which may move relative to each BS, may receive data from one or more base stations depending on the location of the MS relative to each BS. For example, the MS may receive data from SEG 3 of BS1, SEG 2 of BS2, and/or SEG 1 of BS3 when the MS is located as shown.

When a receiver in the MS is turned on (i.e., when the MS is powered up), the MS may associate with an appropriate segment of a corresponding BS depending on the location of the MS. The MS, however, can process data in a frame transmitted by a BS only if the MS can correctly detect a preamble sequence in the frame. Specifically, the MS can perform frame synchronization and retrieval of a cell ID (IDcell) and a segment number of the BS from the frame if the MS can detect the preamble sequence in the frame.

Referring now to FIG. 4, OFDMA systems may use 1024 and 512 sub-carriers to modulate and transmit data. OFDMA systems using 1024 and 512 sub-carriers are generally referred to as OFDMA systems having 1024 and 512 FFT modes, respectively. Additionally, I.E.E.E. 802.16e supports 128 FFT and 2048 FFT modes.

A total of 114 preamble sequences exist for OFDMA systems that use fast Fourier transforms (FFT) to modulate 1024 and 512 sub-carriers. Each preamble sequence is unique. That is, each preamble sequence is distinct from another preamble sequence and is identified by an index number. The index number may be referred to as preamble sequence index. Each preamble sequence is 284 and 143 bits long for 1024 and 512 FFT modes, respectively.

Since one MS may typically communicate with up to three base stations, each BS modulates every third sub-carrier. That is, each BS modulates one of every three sub-carriers. Additionally, each BS uses only one bit of the total bits in a preamble sequence when modulating every third sub-carrier. For example, in 1024 FFT mode, the BS may use bit numbers 1, 2, 3, . . . , etc., of the 284 bits in a preamble sequence to modulate sub-carrier numbers 1, 4, 7, . . . , etc., of the 1024 sub-carriers, respectively.

Each BS may use the same set of sub-carriers. Each segment in a BS, however, uses distinct sub-carriers at least for preamble purposes. For example, for each BS, segment 1 (SEG1) may use sub-carriers 0, 3, 6, 9, . . . , etc.; segment 2 (SEG2) may use sub-carriers 1, 4, 7, 10, . . . , etc.; and segment 3 (SEG3) may use sub-carriers 2, 5, 8, 11, . . . , etc.

Consequently, the MS receives distinct signals from each BS. For example, the MS may receive signals from SEG2 of BS2 on sub-carriers 1, 4, 7, 10, . . . , etc., from SEG1 of BS3 on sub-carriers 0, 3, 6, 9, . . . , etc., and from SEG 3 of BS1 on sub-carriers 2, 5, 8, 11, . . . , etc. Thus, the signals received by the MS may not interfere with each other since their sub-carriers are distinct.

A set of sub-carriers for segment n may be mathematically expressed as follows.

$$PreambleCarrierSet_n = n + 3k$$

where $0 \leq k \leq 283$ for 1024 FFT mode and $0 \leq k \leq 142$ for 512 FFT mode. Additionally, there may be 86 guard sub-carriers on the left and right ends of the spectrum in 1024 FFT mode. In the 512 FFT mode, there may be 42 guard sub-carriers on the left end and 41 guard sub-carriers on the right end.

Typically, when the receiver in the MS is turned on, the MS initially performs symbol timing and carrier frequency synchronization before the MS can detect a preamble sequence. The MS may perform these tasks using a cyclic prefix in the data frame. Thereafter, the MS determines whether a first symbol in the frame is a preamble symbol. If the first symbol is a preamble symbol, then the MS determines which preamble sequence is present in the frame. Once the MS determines the preamble sequence, the MS can associate with a corresponding segment of an appropriate BS.

Symbols in preamble sequences (i.e., preamble symbols) typically have higher energy than data symbols. For example, the energy of the preamble symbols is typically 8/3 times (i.e., 4.26 dB higher than) the energy of data symbols. This is useful in distinguishing preamble symbols from data symbols.

Additionally, the preamble sequences are almost orthogonal. That is, a cross-correlation between any two preamble sequences is very small. For example, the cross-correlation is typically less than 0.2. This is useful in distinguishing individual preamble sequences from one another. As shown in the table in FIG. 4, if the MS detects a preamble sequence having an index 0, then the MS associates with segment 0 of BS having cell ID 0, and so on.

Base stations and mobile stations may be configured to operate in Worldwide Interoperability for Microwave Access (WiMAX) wireless networks. WiMAX is a standards-based technology enabling wireless broadband access as an alternative to wired broadband like cable and DSL. WiMAX provides fixed, nomadic, portable, and mobile wireless connectivity without the need for a direct line-of-sight with a base station. WiMAX technology may be incorporated in portable electronic devices such as notebook computers, personal digital assistants (PDAs), etc. The WiMAX standards enumerated in "Stage 2 Verification And Validation Readiness Draft," Release 1, dated Aug. 8, 2006 and "Stage 3 Verification And Validation Readiness Draft," Release 1, dated Aug. 8, 2006 are incorporated herein by reference in their entirety.

Mobile WiMAX supports a full range of smart antenna technologies including beamforming, spatial multiplexing, etc., to enhance system performance. Mobile WiMAX supports adaptive switching between these options to maximize the benefit of smart antenna technologies under different channel conditions. Smart antenna technologies typically involve complex vector and matrix operations on signals due to multiple antennas. Typically, base stations may have at least two transmit antennas but may transmit preamble symbols via only one transmit antenna. Mobile stations may have at least two receive antennas and may receive signals via more than one receive antenna.

Figure 5:
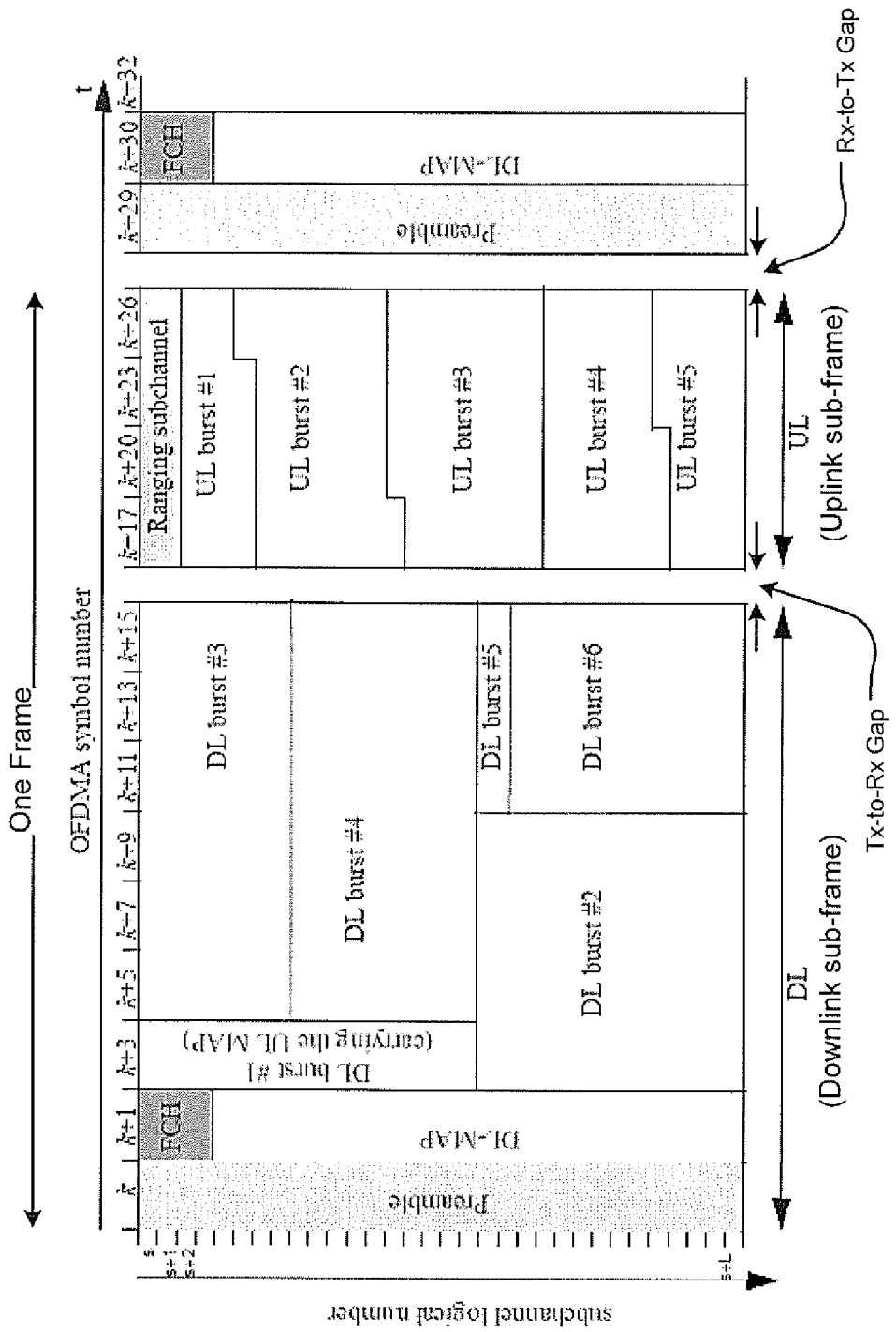
FIG. 5 is a schematic of a frame structured utilized by Worldwide Interoperability for Microwave Access (WiMAX) systems.

Referring now to FIG. 5, an exemplary frame structure for WiMAX time division duplex (TDD) mode is shown. A frame comprises a downlink (DL) sub-frame and an uplink (UL) sub-frame. A first symbol of the DL sub-frame is a preamble symbol. Accordingly, when a physical layer (PHY) module of the MS performs frame synchronization, the PHY module identifies a beginning of the frame by determining a location of the preamble symbol in the frame. In other words, the PHY module detects the beginning of the frame by detecting the preamble symbol. Although the present disclosure uses WiMAX as an example, the teachings of the disclosure may be applied to any OFDM system that uses preamble symbols as first symbols of downlink frames.

When detecting preamble symbols, the PHY module may utilize at least one of two properties that distinguish preamble symbols from data symbols: a modulation property and an energy property. According to the modulation property, the modulation used to modulate sub-carriers with preamble symbols is different than the modulation used to modulate the sub-carriers with data symbols. Specifically, binary phase shift keying (BPSK) modulation is used to modulate pilot sub-carriers with preamble symbols. In contrast, quadrature phase shift keying (QPSK) or quadrature amplitude modulation (QAM) (e.g., 16QAM or 64QAM) is used to modulate data sub-carriers with data symbols.

According to the energy property, when the PHY module receives signals comprising a set of sub-carriers from one or more of three segments, the signal power (i.e., the energy) of sub-carriers carrying preamble symbols may differ in the three segments. In contrast, the signal power of the sub-carriers carrying data symbols may be the same in the three sets. Specifically, since every third sub-carrier is modulated per segment using preamble symbols, the PHY module may receive signals comprising up to three sets of sub-carriers. The sub-carriers carrying preamble symbols in each set may have different signal power. On the other hand, since all available sub-carriers are modulated using data symbols, the sub-carriers carrying data symbols may have approximately same signal power in each of the three sets.

The present disclosure relates to three different systems 100-1, 100-2, and 100-3 (collectively systems 100) that use at least one of the modulation and the energy properties to perform frame synchronization. The systems 100 may perform frame synchronization when symbol timing and carrier frequency are known. When symbol timing and carrier frequency are unknown, the systems 100 may perform symbol timing and carrier frequency synchronization using the carrier prefix that precedes each OFDM symbol. Subsequently, the systems 100 may perform frame synchronization using the symbols with known timing and carrier frequency. Alternatively, the systems 100 may perform frame synchronization using every symbol boundary (e.g., every sample, every other sample, etc.) and one or more normalized values of carrier frequency offset (CFO) (e.g., 0 and ½).

When the symbol timing is known and CFO is approximately zero, an input signal received by the PHY module may be mathematically expressed as follows.

$$Y_m[k] = \sum_{s=0}^{2} H_{m,s}[k] X_{m,s}[k] + Z_m[k],$$

where $Y_m[k]$ denotes the input signal for OFDM symbol m and sub-carrier k; $H_{m,s}[k]$ denotes channel gain for OFDM symbol m, sub-carrier k, and segment s; $X_{m,s}[k]$ denotes transmit signal for OFDM symbol m, sub-carrier k, and segment s; and $Z_m[k]$ denotes noise for OFDM symbol m and sub-carrier k. In WiMAX systems, the channel gain may change negligibly over three sub-carriers.

Figure 6:
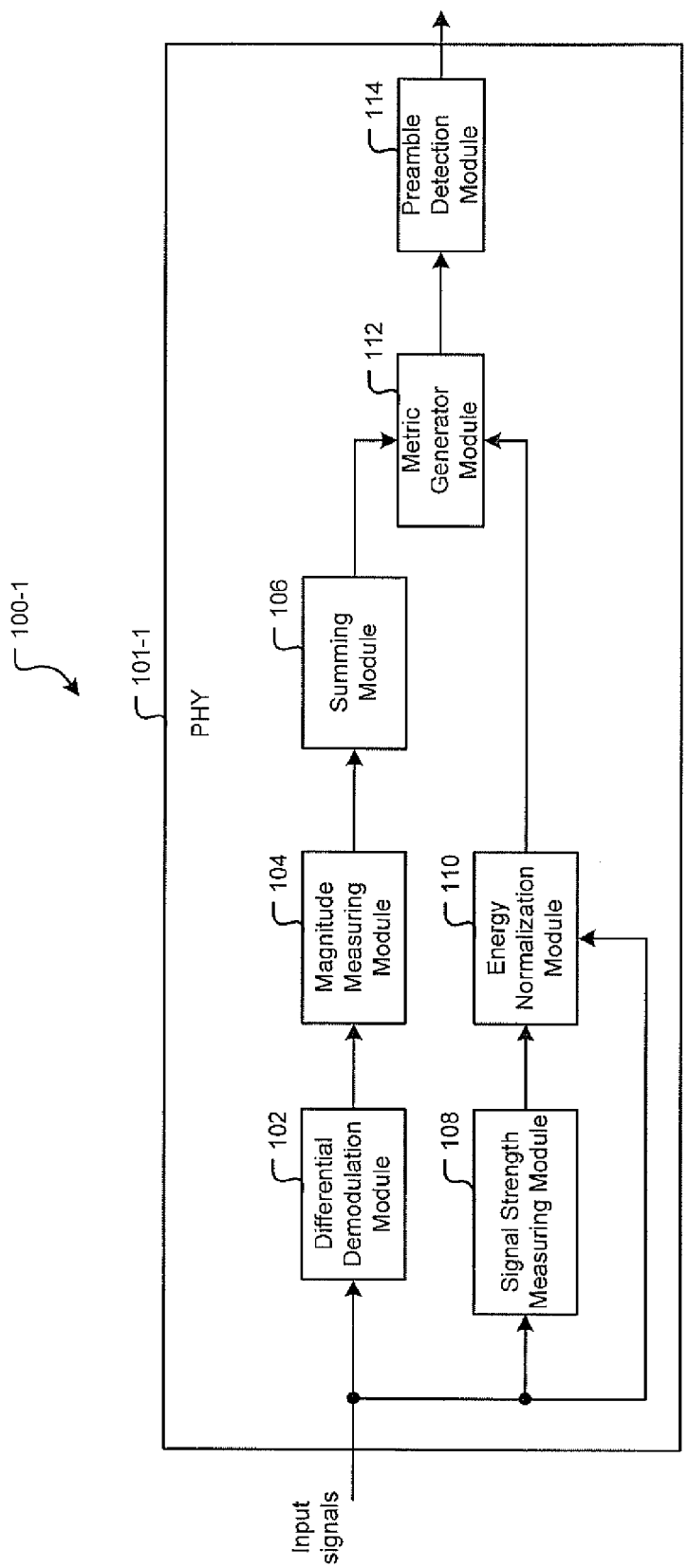
FIG. 6 is a functional block diagram of an exemplary frame synchronization system according to the present disclosure.

Referring now to FIG. 6, the system 100-1 that performs frame synchronization using both modulation and energy properties of the preamble symbols is shown. The system 100-1 comprises a PHY module 101-1. The PHY module 101-1 may comprise a differential demodulation module 102, a magnitude measuring module 104, a summing module 106, a signal strength measuring module 108, an energy normalization module 110, a metric generator module 112, and a preamble detection module 114.

The differential demodulation module 102 may differentially demodulate the input signals that are s sub-carriers apart and generate differentially demodulated signals, where s=3 for WiMAX systems. The magnitude measuring module 104 may measure magnitudes (i.e., absolute values) of real parts of the differentially demodulated signals. The summing module 106 may generate a sum of the magnitudes for a set of pilot sub-carriers received from a segment. Thus, the summing module 106 may generate s sums for s sets of pilot sub-carriers received from s segments.

The signal strength measuring module 108 may measure the signal strength of the input signal. The energy normalization module 110 may generate a sum of energies of all pilot sub-carriers received from all the segments when the signal strength of the input signal is very high (i.e., greater than or equal to a predetermined threshold).

The metric generator module 112 may generate a metric $C_m$ for each symbol m as follows.

$$C_m = \max_{0 \leq s \leq 2} \frac{\sum_{k \in P'_s} |Re\{Y_m[k] Y_m^*[k-3]\}|}{\sum_{k \in P'_1 \cup P'_2 \cup P'_3} |Y_m[k]|^2},$$

where $P_s'$ is a set of pilot sub-carriers received from segment s except the left-most pilot sub-carrier, where $0 \leq s \leq 2$; $Y_m^*[k-3]$ is a complex conjugate of $Y_m[k-3]$, where $Y_m[k-3]$ denotes an input signal for OFDM symbol m and sub-carrier (k-3), and $\{Y_m[k] Y_m^*[k-3]\}$ denotes differential demodulation. The summing module 106 generates the numerators of the metric $C_m$ for each pilot sub-carrier set (i.e., for a set of pilot sub-carriers received from each segment).

Since BPSK modulation is used to modulate pilot sub-carriers carrying preamble symbols, the value of $Re\{Y_m[k] Y_m^*[k-3]\}$ may be 1 or −1, and the value of $|Re\{Y_m[k] Y_m^*[k-3]\}|$ may be 1 when the channel gain is approximately 1 and the noise is negligible. Thus, the value of the numerator of $C_m$ for preamble symbols may be approximately equal to the number of pilot sub-carriers.

On the other hand, since QPSK (or QAM) modulation is used to modulate sub-carriers carrying data symbols, the value of $Re\{Y_m[k] Y_m^*[k-3]\}$ may be ±1 or ±j, and the value of $|Re\{Y_m[k] Y_m^*[k-3]\}|$ may be 1 or 0, respectively. Thus, the value of the numerator of $C_m$ for data symbols may be approximately equal to half the number of pilot sub-carriers. Accordingly, the value of the metric $C_m$ for the preamble symbol may be approximately twice the value of the metric $C_m$ for the data symbols.

When the signal strength of the input signal is greater than or equal to the predetermined threshold, metric generator module 112 generates s ratios by dividing each sum of the s sums of magnitudes by the sum of energies of all sub-carriers. The metric generator module 112 generates the metric $C_m$ for a symbol in by selecting a largest of the ratios. The metric generator module 112 generates the metric $C_m$ for each symbol m. The preamble detection module 114 detects one of the in symbols having a largest metric $C_m$ and determines that the symbol with the largest metric $C_m$ is the preamble symbol.

Since BPSK modulation is used to modulate sub-carriers carrying preamble symbols, the numerator of the metric $C_m$ may be approximated as follows when noise is negligible.

$$|Re\{Y_m[k] Y_m^*[k-3]\}| \approx |Re\{\pm Y_m[k] Y_m^*[k]\}| = |Y_m[k]|^2.$$

Accordingly, the equation for the metric $C_m$ may be simplified as follows.

$$C_m = \max_{0 \le s \le 2} \frac{\sum_{k \in P'_s} |Y_m[k]|^2}{\sum_{k \in P'_1 \cup P'_2 \cup P'_3} |Y_m[k]|^2}.$$

Thus, the value of $C_m$ may be approximately 1 when the input signal includes signals is received from only one segment and approximately ⅓ when the input signal includes signals received from all three segments.

Additionally, when the input signal includes signals received from only one segment, the value of the denominator of the metric $C_m$ for the preamble symbol may be ⅓ of the value of the denominator for the data symbol. This is because only every third of the pilot sub-carriers are modulated using the preamble symbols, while all the sub-carriers are modulated using the data symbols. Accordingly, the value of the metric $C_m$ for preamble symbols may be three times greater than the value of the metric $C_m$ for the data symbols. The preamble detection module 114 determines that the symbol with the largest metric $C_m$ is the preamble symbol.

When an MS (not shown) comprising the PHY module 101-1 includes R receive antennas (not shown), the PHY module 101-1 may receive input signals from one or more segments via R antennas, where R is an integer greater than or equal to 1. The metric generator module 112 may generate the metric $C_m$ as follows.

$$C_m = \max_{0 \le s \le 2} \frac{\sum_{r=1}^{R} \sum_{k \in P'_s} |\mathrm{Re}\{Y_{m,r}[k] Y^*_{m,r}[k-3]\}|}{\sum_{r=1}^{R} \sum_{k \in P'_1 \cup P'_2 \cup P'_3} |Y_{m,r}[k]|^2}.$$

Specifically, the summing module 106 generates a sum of magnitudes of real parts of the differentially demodulated signals for a set of pilot sub-carriers received from a segment via an antenna. Thus, the summing module 106 generates R first sums for the set of pilot sub-carriers received from the R antennas. The summing module 106 generates a second sum by adding the R first sums. Thus, the summing module 106 generates s second sums for s sets of pilot sub-carriers received from s segments via the R antennas.

The energy normalization module 110 generates a sum of energies of all pilot sub-carriers received from all the segments via the R antennas. The metric generator module 112 generates ratios of the s second sums and the sum of energies. The metric generator module 112 generates the metric $C_m$ for a symbol m by selecting a largest of the ratios.

The metric generator module 112 generates the metric $C_m$ for each symbol m. The preamble detection module 114 detects one of the m symbols having a largest metric $C_m$ and determines that the symbol with the largest metric $C_m$ is the preamble symbol.

Figure 7:
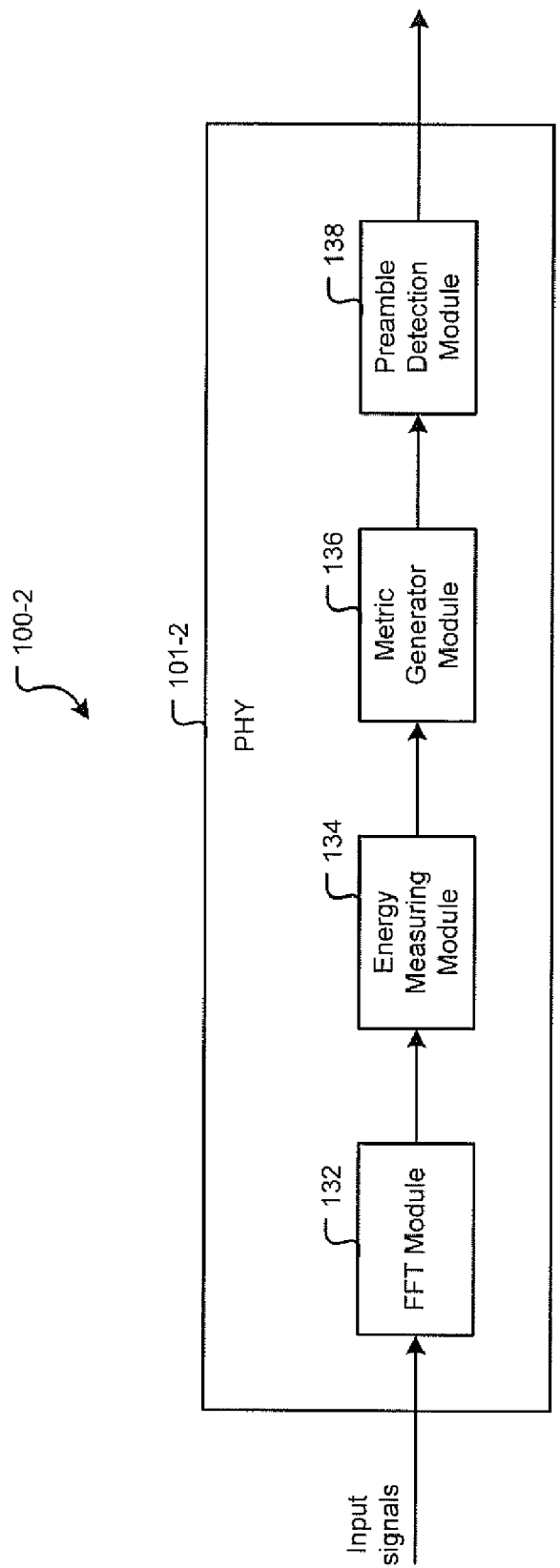
FIG. 7 is a functional block diagram of an exemplary frame synchronization system according to the present disclosure.

Referring now to FIG. 7, the system 100-2 that performs frame synchronization using only the energy property of the preamble symbols is shown. The system 100-2 comprises a PHY module 101-2. The PHY module 101-2 may comprise an FFT module 132, an energy measuring module 134, a metric generator module 136, and a preamble detection module 138. The FFT module 132 may convert input signals from time domain to frequency domain. The energy measuring module 134 measures the energies of all pilot sub-carriers of a pilot sub-carrier set received from a segment and generates an energy value that is a sum of the energies. Thus, the energy measuring module 134 may generate s energy values for s segments.

The metric generator module 136 generates the metric $C_m$ for a symbol m by dividing a maximum of the energy values by a minimum of the energy values. The metric $C_m$ may be mathematically expressed as follows.

$$C_m = \frac{\max_{0 \le s \le 2} \sum_{k \in P_s} |Y_m[k]|^2}{\min_{0 \le s \le 2} \sum_{k \in P_s} |Y_m[k]|^2}.$$

The metric generator module 136 may generate the metric $C_m$ for each symbol m.

According to the energy property, the energy of the sub-carriers carrying preamble symbols may differ in the three sub-carrier sets, while the energy of the sub-carriers carrying data symbols may be the same in the three sets. Thus, for preamble symbols, the maximum energy value may be greater than the minimum energy value. On the other hand, for data symbols, the maximum energy value may be approximately equal to the minimum energy value.

Accordingly, the value of the metric $C_m$ for preamble symbols may be greater than the value of the metric $C_m$ for the data symbols. Specifically, the value of the metric $C_m$ for preamble symbols may be greater than 1 while the value of the metric $C_m$ for the data symbols may be approximately less than or equal to 1. The preamble detection module 138 detects one of the m symbols having a largest metric $C_m$ and determines that the symbol with the largest metric $C_m$ is the preamble symbol.

When an MS (not shown) comprising the PHY module 101-2 includes R receive antennas (not shown), the PHY module 101-2 may receive input signals from one or more segments via R antennas, where R is an integer greater than or equal to 1. The metric generator module 136 may generate the metric $C_m$ as follows.

$$C_m = \sum_{r=1}^{R} \frac{\max_{0 \le s \le 2} \sum_{k \in P_s} |Y_{m,r}[k]|^2}{\min_{0 \le s \le 2} \sum_{k \in P_s} |Y_{m,r}[k]|^2}.$$

Specifically, the energy measuring module 134 measures the energies of all the pilot sub-carriers of a pilot sub-carrier set received from a segment via an antenna and generates an energy value that is a sum of the energies. Thus, the energy measuring module 134 generates s energy values for pilot sub-carrier sets received from s segments via the antenna. The metric generator module 136 generates a ratio of maximum to minimum energy values. Thus, the metric generator module 136 generates the ratio for each antenna. The metric generator module 136 generates the metric $C_m$ for the symbol m by adding the ratios generated for all the antennas.

The metric generator module 136 may generate the metric $C_m$ for each symbol m. The preamble detection module 138 detects one of the m symbols having the largest metric $C_m$ and determines that the symbol with the largest metric $C_m$ is the preamble symbol.

In the system 100-2, before the energy measuring module 134 can measure the energy of the pilot sub-carrier sets, the FFT module 132 converts input signals from time domain to frequency domain. The FFT operations, however, are computation-intensive and may increase the complexity of the system 100-2.

Figure 8:
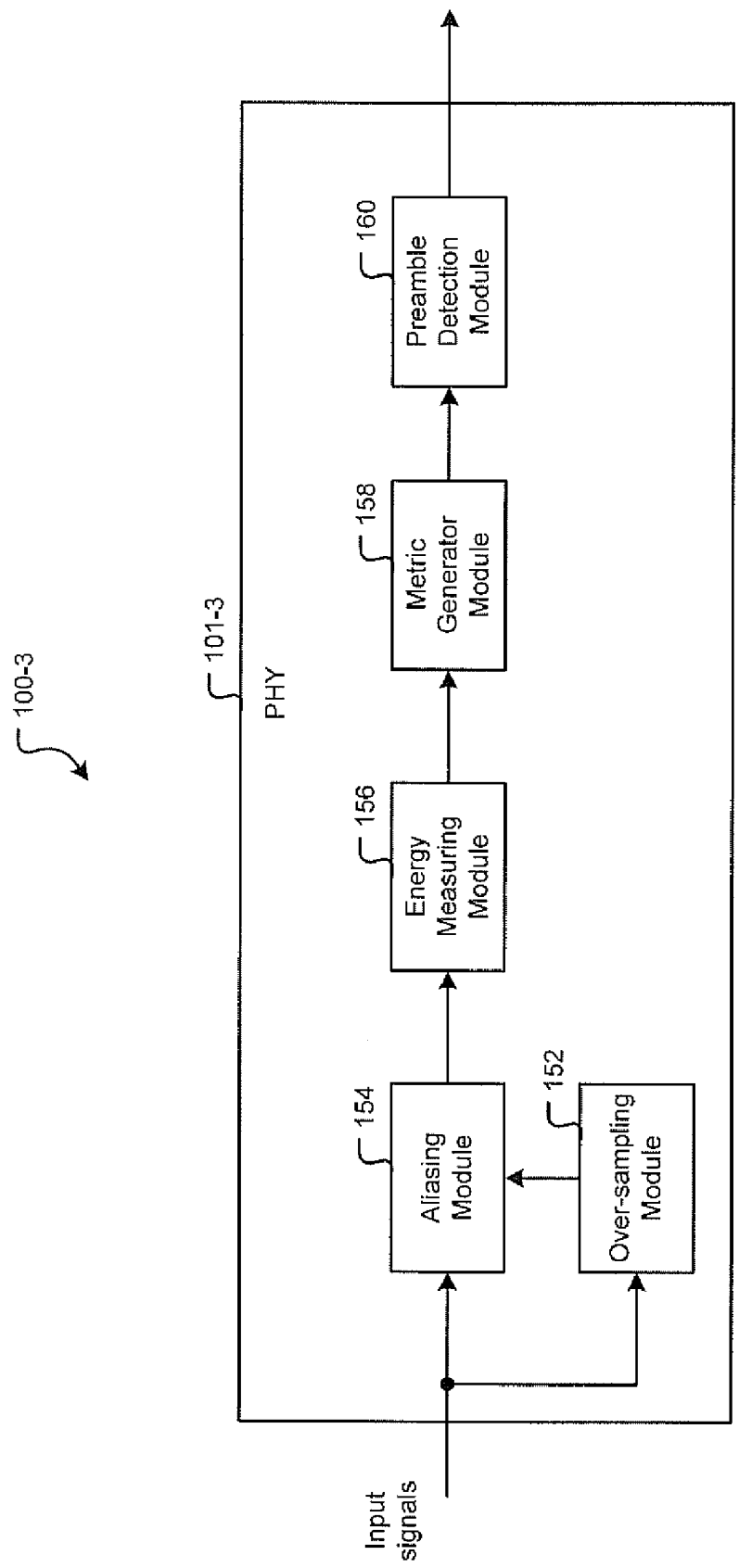
FIG. 8 is a functional block diagram of an exemplary frame synchronization system according to the present disclosure.

Referring now to FIG. 8, the system 100-3 that performs frame synchronization using the energy property but without using FFT is shown. Instead of FFT, the system 100-3 uses aliasing that may be equivalent to FFT but is computationally less complex than FFT. The system 100-3 comprises a PHY module 101-3. The PHY module 101-3 may comprise an over-sampling module 152, an aliasing module 154, an energy measuring module 156, a metric generator module 158, and a preamble detection module 160.

The over-sampling module 152 over-samples the input signals received from s segments and generates an over-sampled signal when the number of sub-carriers N is not an integer multiple of the number of segments s. For example, in WiMAX systems using 1024 FFT mode, N=1024, and s=3. The input signal in the time domain may include 1024 samples received from 3 segments. Since every third of the 1024 sub-carriers is modulated with a preamble symbol, and since 1024 is not an integer multiple of 3, the over-sampling module 152 may over-sample the input signal 3 times in the time domain and generate 3 sets of 1024 samples. The over-sampling module 152 does not over-sample the input signal when N is an integer multiple of s.

The aliasing module 154 performs aliasing operation on the input signal when N is an integer multiple of s and generates aliased signals. Alternatively, the aliasing module 154 performs aliasing operation on the over-sampled signal when N is not an integer multiple of s and generates aliased signals. The energy measuring module 156 measures the energies of all samples in the aliased signals and generates energy values that are sums of the energies. Thus, the energy measuring module 156 generates s energy values for s segments.

The metric generator module 158 generates the metric $C_m$ for a symbol m by dividing a maximum of the energy values by a minimum of the energy values. The metric $C_m$ may be mathematically expressed as follows.

$$C_m = \frac{\max_{0 \le s \le 2} \sum_{n=0}^{N-1} \left| \sum_{p=0}^{2} e^{-j\frac{2\pi sp}{3}} \tilde{y}_m[n+pN] \right|^2}{\min_{0 \le s \le 2} \sum_{n=0}^{N-1} \left| \sum_{p=0}^{2} e^{-j\frac{2\pi sp}{3}} \tilde{y}_m[n+pN] \right|^2},$$

where $\tilde{y}_m[n]$ denotes an over-sampled version of an input signal $y_m[n]$, n denotes samples, p denotes sets of over-sampled samples (e.g., p=3 when $y_m[n]$ is over-sampled three times) and s denotes the number of segments.

If $y_m(t)$ denotes the input signal in the time domain, where t=nT, then the over-sampled version of the input signal is mathematically expressed by the equation $\tilde{y}_m[n]=y_m(nT/3)$. The energy value of an $n^{th}$ sample generated by aliasing is denoted by the following term.

$$\left| \sum_{p=0}^{2} e^{-j\frac{2\pi sp}{3}} \tilde{y}_m[n+pN] \right|^2.$$

Measuring energy in time domain using aliasing may be approximately equivalent to measuring the energy in the frequency domain using FFT. The equivalence may be mathematically expressed as follows.

$$\frac{1}{3} \sum_{n=0}^{N-1} \left| \sum_{p=0}^{2} e^{-j\frac{2\pi sp}{3}} \tilde{y}_m[n+pN] \right|^2 = \sum_{k=0}^{N-1} \left| \tilde{Y}_m[3k+s] \right|^2 \approx 3 \sum_{k \in P_s} |Y_m[k]|^2$$

The metric generator module 158 may generate the metric $C_m$ for each symbol m. According to the energy property, for preamble symbols, the maximum energy value may be greater than the minimum energy value. On the other hand, for data symbols, the maximum energy value may be approximately equal to the minimum energy value. Accordingly, the value of the metric $C_m$ for preamble symbols may be greater than the value of the metric $C_m$ for data symbols. Specifically, the value of the metric $C_m$ for preamble symbols may be greater than 1 while the value of the metric $C_m$ for data symbols may be approximately less than or equal to 1. The preamble detection module 160 detects one of the m symbols having a largest metric $C_m$ and determines that the symbol with the largest metric $C_m$ is the preamble symbol.

When an MS (not shown) comprising the PHY module 101-3 includes R receive antennas (not shown), the PHY module 101-3 may receive input signals from one or more segments via R antennas, where R is an integer greater than or equal to 1. The metric generator module 158 may generate the metric $C_m$ as follows.

$$C_m = \sum_{r=1}^{R} \frac{\max_{0 \le s \le 2} \sum_{n=0}^{N-1} \left| \sum_{p=0}^{2} e^{-j\frac{2\pi sp}{3}} \tilde{y}_{m,r}[n+pN] \right|^2}{\min_{0 \le s \le 2} \sum_{n=0}^{N-1} \left| \sum_{p=0}^{2} e^{-j\frac{2\pi sp}{3}} \tilde{y}_{m,r}[n+pN] \right|^2}$$

Specifically, the energy measuring module 156 measures energies of all samples in the aliased signals generated based on input signals received from a segment via an antenna. The energy measuring module 156 generates an energy value that is a sum of the energies. Thus, the energy measuring module 156 generates s energy values for s segments. The metric generator module 158 generates a ratio of maximum to minimum energy values. Thus, the metric generator module 158 generates the ratio for each antenna. The metric generator module 158 generates the metric $C_m$ for the symbol m by adding the ratios generated for all the antennas.

The metric generator module 158 may generate the metric $C_m$ for each symbol m. The preamble detection module 160 detects one of the m symbols having the largest metric $C_m$ and determines that the symbol with the largest metric $C_m$ is the preamble symbol.

Generally, the system 100-3 may be used when one of every S sub-carriers is modulated using preamble symbols (i.e., when the number of segments s=S) and when N (i.e., the FFT size) is or is not an integer multiple of S. Specifically, when N is an integer multiple of S, the metric $C_m$ may be mathematically generated as follows.

$$C_m = \frac{\max\limits_{0 \leq s \leq S-1} \sum\limits_{n=0}^{N/S-1} \left| \sum\limits_{p=0}^{S-1} e^{-j\frac{2\pi sp}{S}} y_m\left[n + p\frac{N}{S}\right] \right|^2}{\min\limits_{0 \leq s \leq S-1} \sum\limits_{n=0}^{N/S-1} \left| \sum\limits_{p=0}^{S-1} e^{-j\frac{2\pi sp}{S}} y_m\left[n + p\frac{N}{S}\right] \right|^2}.$$

On the other hand, when N is not an integer multiple of S, the metric $C_m$ may be mathematically generated as follows.

$$C_m = \frac{\max\limits_{0 \leq s \leq \tilde{S}-1} \sum\limits_{n=0}^{N/\tilde{S}-1} \left| \sum\limits_{p=0}^{\tilde{S}-1} e^{-j\frac{2\pi sp}{\tilde{S}}} \tilde{y}_m\left[n + p\frac{N}{\tilde{S}}\right] \right|^2}{\min\limits_{0 \leq s \leq \tilde{S}-1} \sum\limits_{n=0}^{N/\tilde{S}-1} \left| \sum\limits_{p=0}^{\tilde{S}-1} e^{-j\frac{2\pi sp}{\tilde{S}}} \tilde{y}_m\left[n + p\frac{N}{\tilde{S}}\right] \right|^2},$$

where $\tilde{S}$=gcd (S, N) denotes total number of samples equal to a greatest common divisor (gcd) of S and N generated by over-sampling the input signal $y_m[n]$ by S times.

For example, in WiMAX systems using 1024 FFT mode, N=1024, and since every third of the 1024 sub-carriers is modulated using a preamble symbol, S=3. Since 1024 is not an integer multiple of 3, the over-sampling module 152 over-samples the input signal 3 times and generates gcd(3, 1024)= 3072 samples.

Alternatively, when N is not an integer multiple of s, the over-sampling module 152 may perform a rounding operation on the input signal instead of performing the over-sampling operation. When performing the rounding operation, the over-sampling module 152 may generate samples by dividing N by S and by rounding off the ratio (N/S). The rounding operation may be mathematically denoted by Round (N/S).

In some implementations, the systems 100 may perform frame synchronization (i.e., preamble detection) without first generating all the metrics for a frame and then selecting the largest metric. Instead, when the metric generator modules of the systems 100 generate a metric, the preamble detection modules of the system 100 may compare the metric to a predetermined threshold. When the metric is greater than or equal to the predetermined threshold, the preamble detection modules of the systems 100 may determine that the symbol that generated the metric is the preamble symbol. After detecting the preamble symbol, frame synchronization is complete, and the metric generator modules of the systems 100 may stop generating additional metrics through the remainder of the frame.

Figure 9:
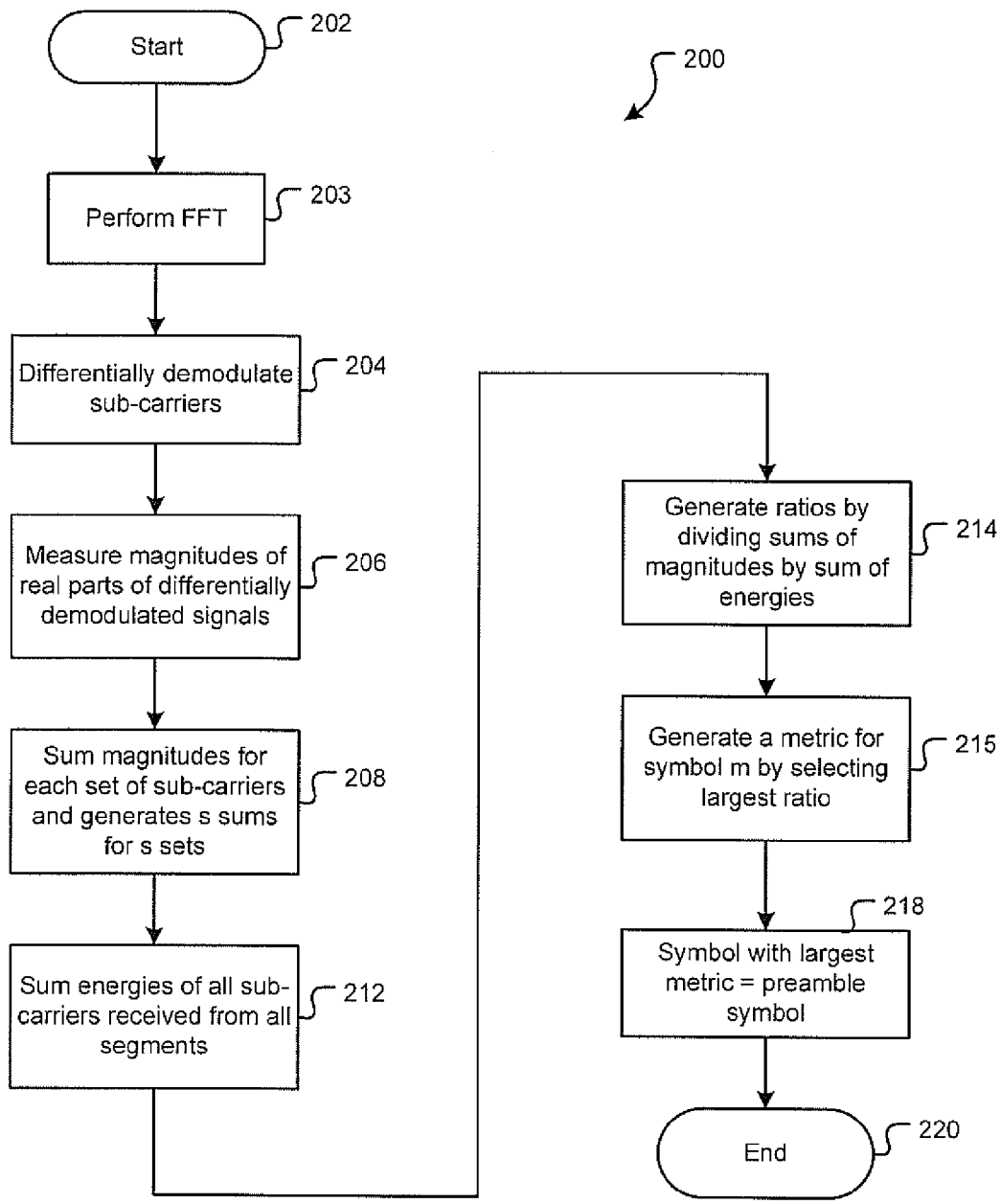
FIG. 9 is a flowchart of an exemplary method for frame synchronization according to the present disclosure.

Referring now to FIG. 9, a method 200 for frame synchronization using the modulation and energy properties of preamble symbols is shown. The method 200 begins at step 202. Input signals are converted from time domain to frequency domain by performing FFT operation in step 203. The differential demodulation module 102 differentially demodulates the input signals that are s sub-carriers apart and generates differentially demodulated signals in step 204. The magnitude measuring module 104 measures magnitudes (i.e., absolute values) of real parts of the differentially demodulated signals in step 206. The summing module 106 generates a sum of the magnitudes for each set of pilot sub-carriers received and generates s sums for s sets of pilot sub-carriers in step 208.

The energy normalization module 110 generates a sum of energies of all pilot sub-carriers received from all the segments in step 212. The metric generator module 112 generates ratios by dividing the sums of the magnitudes by the sum of energies in step 214. The metric generator module 112 generates the metric $C_m$ for the symbol in by selecting the largest of the ratios in step 215. The preamble detection module 114 detects the symbol with the largest metric $C_m$ as the preamble symbol, and the frame synchronization is complete in step 218. The method 200 ends in step 222.

Figure 10:
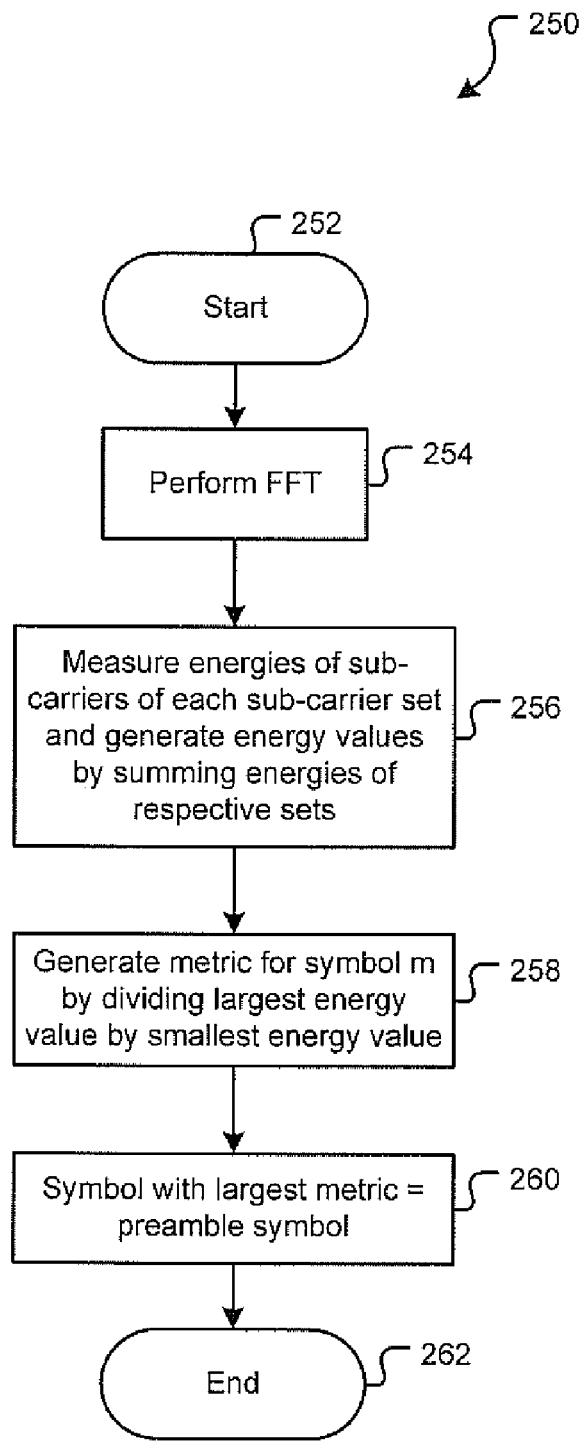
FIG. 10 is a flowchart of an exemplary method for frame synchronization according to the present disclosure.

Referring now to FIG. 10, a method 250 for performing frame synchronization using the energy property of preamble symbols is shown. The method 250 begins at step 252. The FFT module 132 converts input signals from time domain to frequency domain in step 254. The energy measuring module 134 measures the energies of all pilot sub-carriers of a pilot sub-carrier set received from a segment and generates an energy value that is a sum of the energies in step 256. Thus, the energy measuring module 134 generates s energy values for s pilot sub-carrier sets. The metric generator module 136 generates the metric $C_m$ for a symbol m by dividing a largest of the energy values by a smallest of the energy values in step 258. The preamble detection module 138 detects the symbol with the largest metric $C_m$ as the preamble symbol, and the frame synchronization is complete in step 260. The method 250 ends in step 262.

Figure 11:
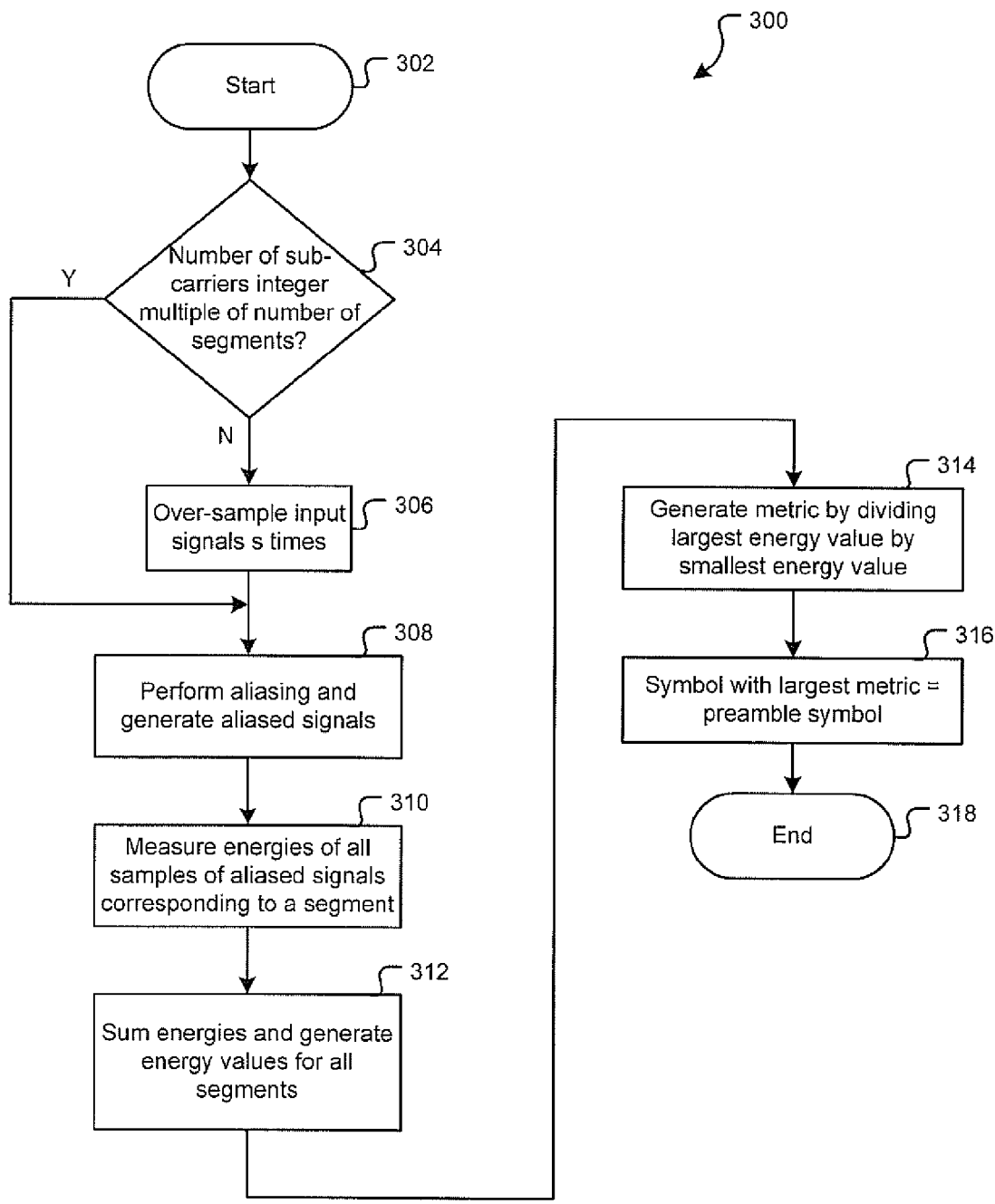
FIG. 11 is a flowchart of an exemplary method for frame synchronization according to the present disclosure.

Referring now to FIG. 11, a method 300 for performing frame synchronization using the energy property of preamble symbols and using aliasing instead of FFT is shown. The method 300 begins at step 302. The over-sampling module 152 determines in step 304 whether the number of sub-carriers is an integer multiple of the number of segments. If the result of step 304 is false, the over-sampling module 152 over-samples the input signals and generates over-sampled signals in step 306. If the result of step 304 if true, the over-sampling module 152 does not over-sample the input signals.

The aliasing module 154 performs the aliasing operation on the input signals (when N is an integer multiple of s) or on the over-sampled signals (when N is not an integer multiple of s) and generates aliased signals in step 308. The energy measuring module 156 measures energies of all samples in the aliased signals corresponding to a segment in step 310. The energy measuring module 156 generates energy values that are sums of the energies in step 312. Thus, the energy measuring module 156 generates s energy values for s segments.

The metric generator module 158 generates the metric $C_m$ by dividing a largest of the energy values by a smallest of the energy values in step 314. The preamble detection module 160 detects the symbol with the largest metric $C_m$ as the preamble symbol, and the frame synchronization is complete in step 316. The method 300 ends in step 318.

Figure 12B:
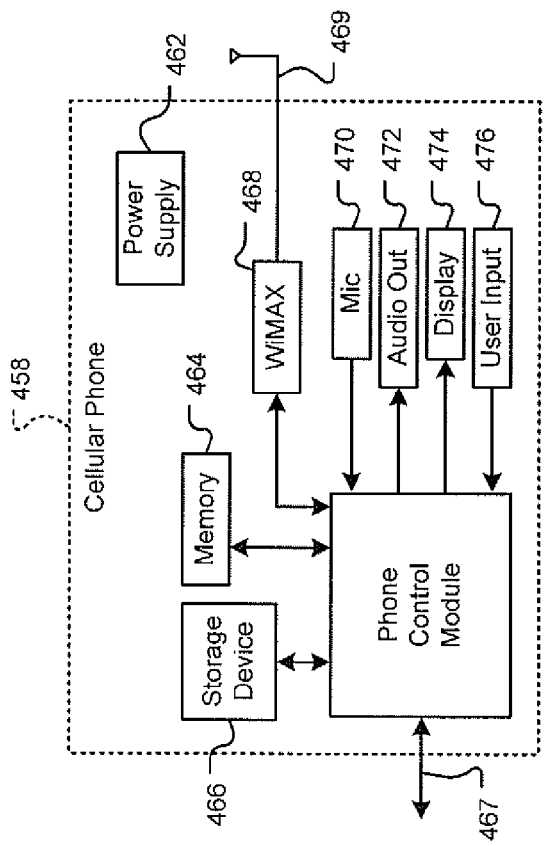
FIG. 12B is a functional block diagram of a cellular phone.
Figure 12A:
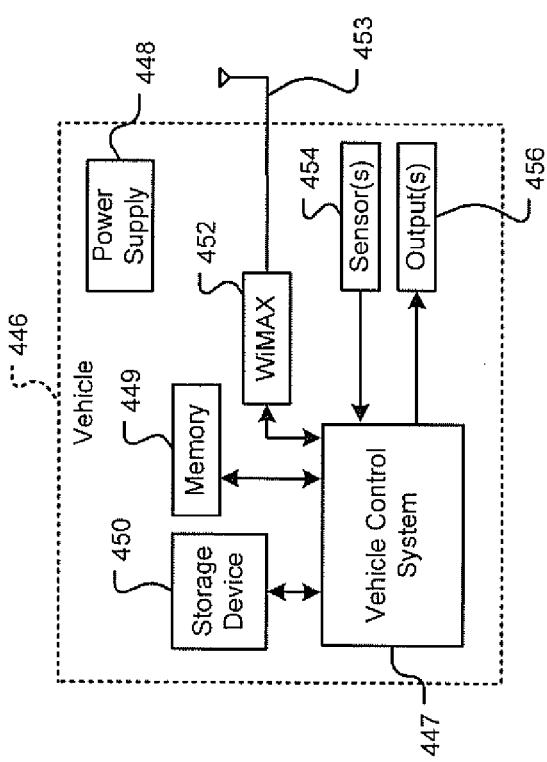
FIG. 12A is a functional block diagram of a vehicle control system.
Figure 12C:
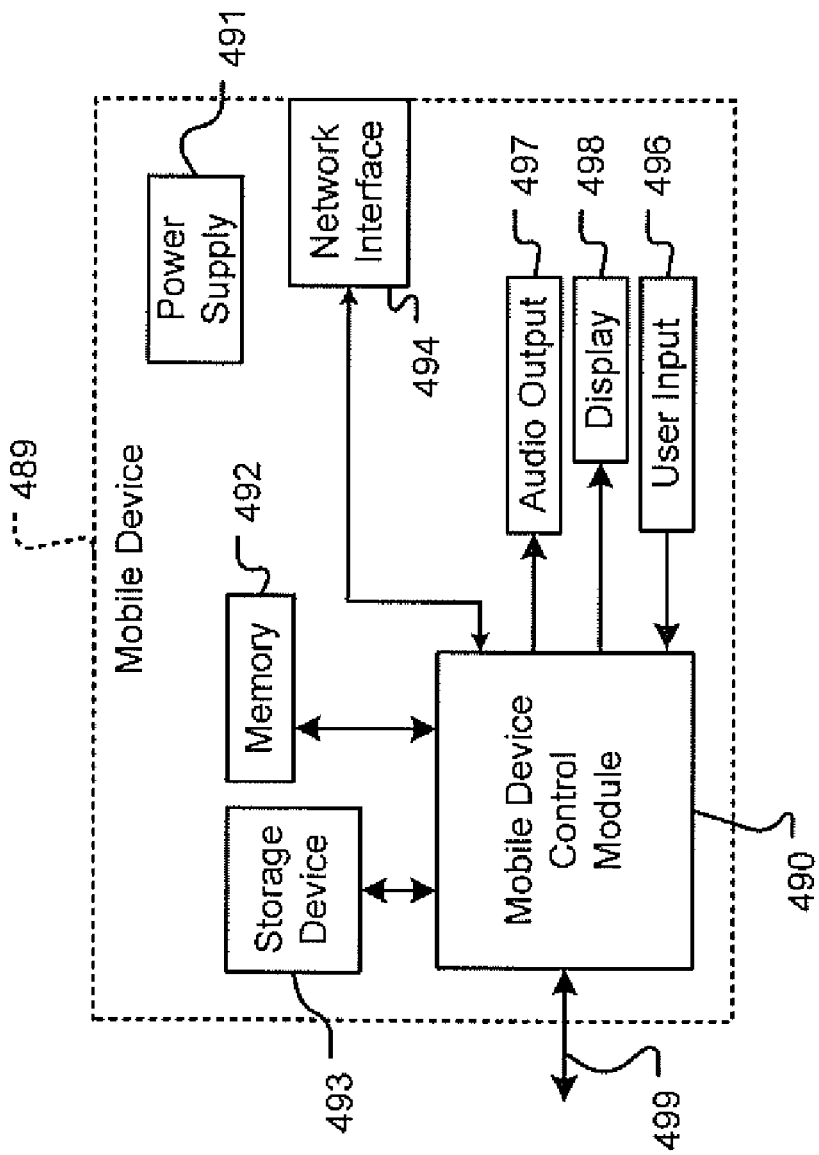
FIG. 12C is a functional block diagram of a mobile device.

Referring now to FIGS. 12A-12C, various exemplary implementations incorporating the teachings of the present disclosure are shown. In FIG. 12A, the teachings of the disclosure may be implemented in a WiMAX interface 452 of a vehicle 446. The vehicle 446 may include a vehicle control system 447, a power supply 448, memory 449, a storage device 450, the WiMAX interface 452, and a plurality of associated antennas 453. The vehicle control system 447 may be a powertrain control system, a body control system, an entertainment control system, an anti-lock braking system (ABS), a navigation system, a telematics system, a lane departure system, an adaptive cruise control system, etc.

The vehicle control system 447 may communicate with one or more sensors 454 and generate one or more output signals 456. The sensors 454 may include temperature sensors, acceleration sensors, pressure sensors, rotational sensors, airflow sensors, etc. The output signals 456 may control engine operating parameters, transmission operating parameters, suspension parameters, etc.

The power supply 448 provides power to the components of the vehicle 446. The vehicle control system 447 may store data in memory 449 and/or the storage device 450. Memory 449 may include random access memory (RAM) and/or nonvolatile memory such as flash memory, phase change memory, or multi-state memory, in which each memory cell has more than two states. The storage device 450 may include an optical storage drive, such as a DVD drive, and/or a hard disk drive (HDD). The vehicle control system 447 may communicate externally using the WiMAX interface 452.

In FIG. 12B, the teachings of the disclosure can be implemented in a WiMAX interface 468 of a cellular phone 458. The cellular phone 458 includes a phone control module 460, a power supply 462, memory 464, a storage device 466, and a cellular network interface 467. The cellular phone 458 may include the WiMAX interface 468 and a plurality of associated antennas 469, a microphone 470, an audio output 472 such as a speaker and/or output jack, a display 474, and a user input device 476 such as a keypad and/or pointing device.

The phone control module 460 may receive input signals from the cellular network interface 467, the WiMAX interface 468, the microphone 470, and/or the user input device 476. The phone control module 460 may process signals, including encoding, decoding, filtering, and/or formatting, and generate output signals. The output signals may be communicated to one or more of memory 464, the storage device 466, the cellular network interface 467, the WiMAX interface 468, and the audio output 472.

Memory 464 may include random access memory (RAM) and/or nonvolatile memory such as flash memory, phase change memory, or multi-state memory, in which each memory cell has more than two states. The storage device 466 may include an optical storage drive, such as a DVD drive, and/or a hard disk drive (HDD). The power supply 462 provides power to the components of the cellular phone 458.

In FIG. 12C, the teachings of the disclosure can be implemented in a network interface 494 of a mobile device 489. The mobile device 489 may include a mobile device control module 490, a power supply 491, memory 492, a storage device 493, the network interface 494, and an external interface 499. The network interface 494 includes a WiMAX interface and an antenna (not shown).

The mobile device control module 490 may receive input signals from the network interface 494 and/or the external interface 499. The external interface 499 may include USB, infrared, and/or Ethernet. The input signals may include compressed audio and/or video, and may be compliant with the MP3 format. Additionally, the mobile device control module 490 may receive input from a user input 496 such as a keypad, touchpad, or individual buttons. The mobile device control module 490 may process input signals, including encoding, decoding, filtering, and/or formatting, and generate output signals.

The mobile device control module 490 may output audio signals to an audio output 497 and video signals to a display 498. The audio output 497 may include a speaker and/or an output jack. The display 498 may present a graphical user interface, which may include menus, icons, etc. The power supply 491 provides power to the components of the mobile device 489. Memory 492 may include random access memory (RAM) and/or nonvolatile memory such as flash memory, phase change memory, or multi-state memory, in which each memory cell has more than two states. The storage device 493 may include an optical storage drive, such as a DVD drive, and/or a hard disk drive (HDD). The mobile device may include a personal digital assistant, a media player, a laptop computer, a gaming console, or other mobile computing device.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A system, comprising:
a magnitude measuring module configured to measure magnitudes of real portions of differentially demodulated signals, wherein the differentially demodulated signals are generated by differential demodulation of signals received from a base station;
an energy normalization module configured to generate a sum of energies of a plurality of subcarriers included in the signals received from the base station; and
a metric generation module configured to
generate a plurality of metrics for a plurality of symbols included in the signals received from the base station, wherein the plurality of metrics are generated based on i) the magnitudes of the real portions of the differentially demodulated signals, and ii) the sum of the energies of the plurality of subcarriers included in the signals received from the base station, and
detect, based on the plurality of metrics, a preamble symbol included in the signals received from the base station.

2. The system of claim 1, further comprising:
a summing module configured to generate a plurality of sums of the magnitudes for a plurality of sets of the subcarriers received from a plurality of segments of the base station,
wherein each of the plurality of sums corresponds to one of the plurality of sets of subcarriers received from one of the plurality of segments.

3. The system of claim 2, wherein the metric generation module is configured to:
generate a plurality of ratios of by dividing the plurality of sums of the magnitudes by the sum of the energies of the plurality of subcarriers; and
generate one of the metrics by selecting a largest one of the ratios.

4. The system of claim 3, further comprising a preamble detection module configured to:
detect one of the symbols having a largest one of the metrics; and
determine that the one of the symbols having the largest one of the metrics is a preamble symbol.

5. The system of claim 1, further comprising a summing module configured to generate, in response to receiving the signals from a plurality of segments of the base station via a plurality of antennas, for each of the plurality of antennas, a plurality of first sums of the magnitudes for a set of the subcarriers received from the plurality of segments of the base station via the plurality of antennas.

6. The system of claim 5, wherein the summing module is configured to:
generate a plurality of second sums by adding the plurality of first sums generated for each of the plurality of antennas, wherein each of the plurality of second sums corresponds to one of a plurality of sets of subcarriers received from one of the plurality of segments via the plurality of antennas.

7. The system of claim 6, wherein the metric generation module is configured to:
generate a plurality of ratios of by dividing the plurality of second sums by the sum of the energies of the plurality of subcarriers; and
generate one of the metrics by selecting a largest one of the ratios.

8. The system of claim 7, further comprising a preamble detection module configured to:
detect one of the symbols having a largest one of the metrics; and
determine that the one of the symbols having the largest one of the metrics is a preamble symbol.

9. A method, comprising:
measuring magnitudes of real portions of differentially demodulated signals, wherein the differentially demodulated signals are generated by differential demodulation of signals received from a base station;
generating a sum of energies of a plurality of subcarriers included in the signals received from the base station;
generating a plurality of metrics for a plurality of symbols included in the signals received from the base station, wherein the plurality of metrics are generated based on i) the magnitudes of the real portions of the differentially demodulated signals, and ii) the sum of the energies of the plurality of subcarriers included in the signals received from the base station; and
detecting, based on the plurality of metrics, a preamble symbol included in the signals received from the base station.

10. The method of claim 9, further comprising:
generating a plurality of sums of the magnitudes for a plurality of sets of the subcarriers received from a plurality of segments of the base station,
wherein each of the plurality of sums corresponds to one of the plurality of sets of subcarriers received from one of the plurality of segments.

11. The method of claim 10, further comprising:
generating a plurality of ratios of by dividing the plurality of sums of the magnitudes by the sum of the energies of the plurality of subcarriers; and
generating one of the metrics by selecting a largest one of the ratios.

12. The method of claim 11, further comprising:
detecting one of the symbols having a largest one of the metrics; and
determining that the one of the symbols having the largest one of the metrics is a preamble symbol.

13. The method of claim 9, further comprising:
receiving the signals via a plurality of antennas; and
generating, for each of the plurality of antennas, a plurality of first sums of the magnitudes for a set of the subcarriers received from a plurality of segments of the base station via the plurality of antennas.

14. The method claim 13, further comprising:
generating a plurality of second sums by adding the plurality of first sums generated for each of the plurality of antennas,
wherein each of the plurality of second sums corresponds to one of a plurality of sets of subcarriers received from one of the plurality of segments via the plurality of antennas.

15. The method of claim 14, further comprising:
generating a plurality of ratios of by dividing the plurality of second sums by the sum of the energies of the plurality of subcarriers; and
generating one of the metrics by selecting a largest one of the ratios.

16. The method of claim 15, further comprising:
detecting one of the symbols having a largest one of the metrics; and
determining that the one of the symbols having the largest one of the metrics is a preamble symbol.

* * * * *